United States Patent [19]

Constanti et al.

[11] Patent Number: 4,480,290
[45] Date of Patent: Oct. 30, 1984

[54] ELECTROLYTIC CAPACITOR INCLUDING A COMPOSITE SEPARATOR BETWEEN THE ANODE AND THE CATHODE THEREOF

[75] Inventors: Jean Constanti, Poissy; Pierre Grandadam, Paris, both of France

[73] Assignee: Les Condensateurs Sic Safco, Colombes, France

[21] Appl. No.: 493,006

[22] Filed: May 9, 1983

Related U.S. Application Data

[63] Continuation-in-part of Ser. No. 169,403, Jul. 16, 1980.

[30] Foreign Application Priority Data

Jul. 17, 1979 [FR] France .................. 79 18496
Dec. 30, 1982 [FR] France .................. 82 22115

[51] Int. Cl.³ .................... H01G 9/00; H02B 9/00
[52] U.S. Cl. .................... 361/433; 361/272; 29/570
[58] Field of Search ............... 361/433, 272; 29/570

[56] References Cited

U.S. PATENT DOCUMENTS

| | | | |
|---|---|---|---|
| 3,351,823 | 11/1967 | Jenny | 361/433 |
| 3,609,467 | 9/1971 | Curtis | 361/433 |
| 3,638,077 | 1/1972 | Chesnot | 361/433 |
| 3,652,902 | 3/1972 | Hart et al. | 361/433 |
| 3,908,157 | 9/1975 | Ross et al. | 361/433 |
| 4,099,218 | 7/1978 | Klein et al. | 361/433 |

Primary Examiner—Donald A. Griffin
Assistant Examiner—Douglas S. Lee
Attorney, Agent, or Firm—Brumbaugh, Graves, Donohue & Raymond

[57] ABSTRACT

The capacitor includes, between an anode and a cathode, a separator formed by at least one porous polymer film and at least one absorbent paper sheet impregnated with an electrolyte, the polymer film being disposed against the anode. The preferred polymer materials are polypropylene and polyester (especially polybutylene terephthalate).

9 Claims, 5 Drawing Figures

ELECTROLYTIC CAPACITOR INCLUDING A COMPOSITE SEPARATOR BETWEEN THE ANODE AND THE CATHODE THEREOF

This is a continuation-in-part of application Ser. No. 169,403, filed July 16, 1980.

The present invention relates to electrolytic capacitors, which usually include a sheet or film of an insulating or dielectric material impregnated with an electrolyte, commonly called separator and located between two electrodes, namely an anode and a cathode, particularly to electrolytic capacitors formed from wound tapes forming the anode, the cathode and the separator.

The invention applies particularly to electrolytic capacitors used in electrotechnology at operating voltages higher than 250 volts in different industrial applications, either operating by pulses of charge and discharge, e.g. with welding machines and magnetizing devices, or for filtering rectified AC currents or non-sinusoidal currents, e.g. with chopped-current supplies, and principally in the cases where the power involved requires these capacitors to be mounted in parallel-series as batteries of capacitors.

A capacitor of this type is described in U.S. Pat. No. 3,978,377 to Jean CONSTANTI, assigned to the same assignee, particularly with reference to FIG. 8.

In the technical applications mentioned above, an electrolytic capacitors is generally traversed by high-intensity currents at different frequencies and is therefore subjected to heating, the heating energy being proportional to the series electric resistance of its different components: terminals, connections, anode, cathode and separator impregnated with electrolyte. It must moreover be able to operate over a wide range of temperatures while enjoying sufficiently stable electrical characteristics.

The measurement of the impedance Z of the capacitor at 100 kHz (which allows the value of the series resistance of the capacitor to be obtained) and the direct resistance measurements on the separate component elements of the capacitor show that the role of the separator is the most important. For example, in a capacitor of 650 $\mu$F at 480 volts comprising an anode of 340×9 cm, a corresponding cathode and a paper separator, the internal resistances are distributed as follows:

3 m$\Omega$ for the anode and cathode tapes,
2 m$\Omega$ for the various connections,
90 m$\Omega$ for the separator impregnated with electrolyte.

Moreover, in a battery assembly, the specific volume v of each capacitor expressed in cm$^3$/$\mu$F has a considerable influence on the size, the weight, the price of the assembly; the same goes for the operating voltage V, the energy stored being a function of V$^2$.

Therefore a "coefficient of quality" given by the expression V$^2$/Zv can be defined.

The aim of the invention is to increase said coefficient of quality, for example by reducing the impedance of the electrolyte-impregnated separator (which forms the essential part of the total impedance Z of the capacitor, appearing in the coefficient of quality) for a given operating voltage V.

The invention provides then essentially a new electrolytic capacitor including an improved separator.

A conventional separator is formed from paper in the form of a tape, impregnated with an electrolyte, as in the preceding example.

Replacing such a separator, which has a relatively high impedance, has already been proposed, the proposals being of two kinds.

On the one hand, it has been suggested constructing an integrated separator at the surface of the anode and/or of the cathode, but only a relatively thin separator has been able to be formed in this way, not allowing operation of the capacitor under high voltage; furthermore, such a separator does not provide easy access of the electrolyte to the electrode with which it is integrated because of the penetration, into the etching holes, of the resins used.

On the other hand, it has been proposed to substitute for the paper tape or strip, or to associate with such a tape, other tapes, particularly of two types.

The first type corresponds to a separator of a fibrous nature obtained by modifications imposed on the absorbent paper and among which may be mentioned:

paper compounded with carbon black or graphite for reducing the series resistance, but the value of this latter only drops to 10$^7$$\Omega$·cm for a foil of 25 microns, this value being too high with respect to that of a high-voltage electrolyte which is of the order of 10$^3$$\Omega$·cm, paper coated by impregnation with a coating of methyl cellulose, or bonded to a film of regenerated cellulose, but such a separator has a low porosity and the impregnation is quite a problem.

The second type corresponds to a separator of a non-fibrous nature, not including paper, such as:

regenerated cellulose which acts by plasticization in a solvent of the electrolyte, but has the disadvantage of a zero porosity which retards the movement of the ions and does not allow a low series resistance to be obtained, gelatine foil which has the same disadvantage as the regenerated cellulose insofar as the porosity is concerned and possesses moreover a greater mechanical fragility, porous polypropylene disclosed in the U.S. Pat. No. 3,908,157 to Sidney D. ROSS as a substitute for paper in separators having a thickness of 25 microns in low-voltage capacitors operating at 20 volts, i.e. under a low voltage.

It has therefore already been proposed, on the one hand, to associate to paper, regenerated cellulose or certain other materials other than polypropylene and, on the other hand, to use polypropylene instead of paper but only for low-voltage capacitors.

The present invention has for an object to provide a composite separator having a low series resistance (within a broad range of temperatures, for example of the order of $-55°$ C. to $+105°$ C.), for forming electrolytic capacitors adapted to operate at a high voltage, capable of storing a high amount of energy and having a high quality factor V$^2$/Zv.

A separator for an electrolytic capacitor in accordance with the invention is characterized by the fact that it is formed by the association of at least one porous polymer film and at least one absorbent paper sheet impregnated with an electrolyte. An electrolytic capacitor in accordance with the invention is characterized by the fact that it includes, between its anode and its cathode, such a separator with a polymer film placed against the anode.

Preferably:

the polymer is polypropylene or a polyester (especially polybutylene terephtalate)

the polymer has an open cellular porosity of at least 30% and has a network of capillaries having a section less than $0.2 \times 10^{-8}$ cm$^2$;

the absorbent paper has an apparent density not greater than 0.55;

the electrolyte comprises, in its solvent phase, at least one solvent chosen from the group formed by butyrolactone and ethylene glycol.

In fact, the Applicants have discovered with surprise, on the one hand, that an electrolyte comprising as solvent butyrolactone or ethylene glycol could be used with a polypropylene film, whereas the above-mentioned U.S. Pat. No. 3,908,157 only provided for other types of solvent and that, on the other hand, it was possible to associate the polypropylene with paper, which was not provided for either by said patent or other earlier publications which only provided for the association of paper with other types of polymers.

Furthermore the Applicants have discovered that the association of paper and polypropylene enabled better separators to be obtained, particularly from the point of view of the quality factor $V^2/Zv$, series resistance and behavior at high temperatures, particularly when a polypropylene film is placed against the anode.

It was also establised that other porous polymers could be used instead of porous polypropylene, especially a porous polyester and more particularly porous polybutylene terephthalate.

Other porous polyesters could also be used, e.g.:
polyethylene terephalate,
polyethylene terephthalate and polyethylene isophthalate copolymer,
polyhydrocarbonate;
and also other porous polymers, e.g.:
polyethylene,
polystyrene,
polycarbonate,
polyamides 6;

some of these polymers are sold under the trademark "POLYWEB" by the RIEGEL PRODUCTS CORPORATION.

Another porous polymer which can be used is microporous polytetrafluorethylene (or PTFE) sold under the trademark "GORE-TEX" by W. L. GORE AND ASSOCIATES INC.

The invention will, in any case, be well understood with the help of the complement of description which follows as well as the accompanying drawings, which complement and drawings are of course only illustrative.

FIGS. 1 and 2 show two electrolytic capacitors embodying the improvements of the invention.

FIGS. 3, 4 and 5 illustrate, by means of comparative curves, the characteristics of capacitors embodying the improvements of the invention and of capacitors of the prior art, the frequencies in hertz or cycles per second being shown as abscissae and the internal impedances being shown as ordinates; the three FIGS. 3, 4 and 5 correspond to measurements made at $+25°$ C., $+105°$ C. and $-40°$ C. respectively.

Referring first of all to FIGS. 1 and 2, there can be seen that an electrolytic capacitor of the coiled type with a coil B (illustrated half-unwould), embodying the improvements of the invention, comprises first of all, in a known way:

an anode 1, formed in the preferred embodiment by an etched aluminum foil, formed anodically at 600 volts and 90 microns thick, a connection 2 for this anode, a cathode 3, formed in the preferred embodiment, by an etched aluminum foil and 30 microns thick, and a connection 4 for this cathode.

The separator $S_2$ or $S_3$ comprises, in accordance with the invention, at least two sheets or films, i.e. at least one absorbent paper sheet impregnated with an electrolyte and at least one porous polymer film.

In the embodiment of FIG. 1, separator $S_2$ is formed solely from two such layers, i.e. an absorbent paper sheet 5 impregnated with electrolyte and a polymer film 6. For reasons which will appear hereafter, paper sheet 5 is disposed against cathode 3, whereas the polymer film 6 is disposed against anode 1.

The part of the separator symmetrical with $S_2$ comprises a paper sheet 5' disposed against the cathode 3 and a polymer film 6' disposed against anode 1.

In the embodiment of FIG. 2, separator $S_3$ is formed from three layers, i.e. two layers, one constituted by an absorbent paper sheet 5 and one constituted by a polymer film 6, formed and disposed as in the embodiment of FIG. 1, and a third intermediate layer 7 disposed between layers 5 and 6 and made, like sheet 5, from absorbent paper impregnated with electrolyte.

The part of the separator symmetrical with $S_3$ comprises a paper sheet 5' and a polymer film 6', formed and disposed as in the embodiment of FIG. 1, and a third intermediate layer 7' disposed between layers 5' and 6', said layer 7' being constituted by an absorbent paper sheet impregnated with electrolyte.

Layers 5', 6' and 7' are formed like layers 5, 6 and 7 respectively.

To bring out the advantages of the capacitors of the invention with respect to the capacitors of the prior art, a series of coiled-type capacitors was constructed, all comprising anodes and cathodes, 1 and 3, of the type described above and two or three layers constituting the separator.

The separators of the eight capacitors thus constructed were formed as shown in the table below.

| Separator model or type | Total thickness of the separator | Layer against the anode | Possible intermediate layer | Layer against the cathode |
| --- | --- | --- | --- | --- |
| I | 75 | porous polypropylene 25 μm | porous polypropylene 25 μm | porous polypropylene 25 μm |
| II | 125 | paper d = 0.30-75 μm | — | paper d = 0.30-50 μm |
| III | 125 | porous polypropylene 25 μm | paper d = 0.30-50 μm | paper d = 0.30-50 μm |
| IV | 125 | paper d = 0.30-50 μm | paper d = 0.30-50 μm | porous polypropylene 25 μm |
| V | 125 | paper d = 0.30-50 μm | porous polypropylene 25 μm | paper d = 0.30-50 μm |
| VI | 175 | paper d = 0.30-75 μm | paper d = 0.30-50 μm | paper d = 0.30-50 μm |
| VII | 175 | porous polypropylene 25 μm | paper d = 0.30-75 μm | paper d = 0.30-75 μm |
| VIII | 175 | paper d = 0.30-75 μm | porous polypropylene 25 μm | paper d = 0.30-75 μm |

μm = microns

FIG. 3 shows the curves of impedance Z plotted against the frequency at the temperature of +25° C. taken on the following capacitors:

Curve I—Capacitor with separator of model I formed from three films of porous polypropylene of 25 microns, i.e. a total thickness of 75 microns.

Curve II—Capacitor with separator of model II formed from a paper sheet of 75 microns with an apparent density of 0.30 placed against the anode and a paper sheet of thickness 50 microns with an apparent density of 0.30 placed against the cathode, i.e. a total thickness of 125 microns.

Curve III—Capacitor with separator of model III in accordance with the invention formed from three layers: a porous polypropylene film of a thickness of 25 microns placed against the anode and two absorbent paper sheets with a thickness of 50 microns and an apparent density of 0.30 placed against the cathode, i.e. a total thickness of 125 microns.

Curve IV—Sic-Safco capacitor of 650 $\mu$F, 480 volts presently available on the market with a paper separator having an apparent density of 0.50 appearing in Table XII of the present description.

Figure 1:
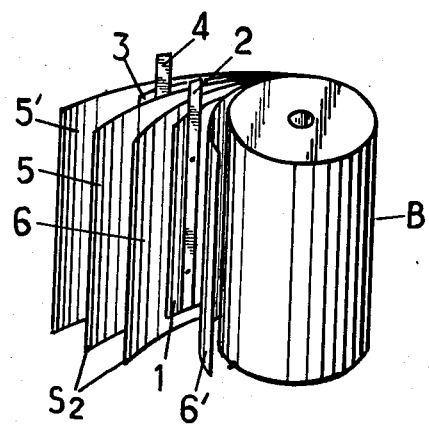
Figure 2:
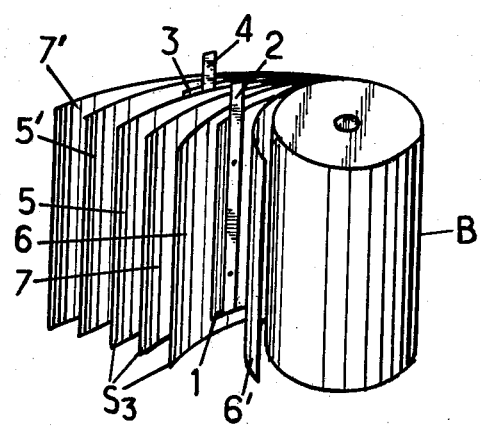

More detailed information will now be given concerning the structure of the separators of models I to VIII and the tests effected will be outlined.

The capacitors used for drawing up the comparison between separators I to VIII were wound or coiled with an anode of 320×9 cm, made from aluminum of 99.99% purity and a thickness of 90 microns etched and formed anodically at 600 volts, and with a cathode of a thickness of 30 microns, made from etched aluminum, separated by the separators whose construction has been indicated above and is given in the tables hereafter.

The obtained coils were impregnated with an electrolyte for high voltage formulated in accordance with the U.S. Pat. No. 3,638,077 to Bernard CHESNOT and assigned to the same Assignee, then each was placed in a conventional filtering electrolytic capacitor case having a diameter of 51 mm and a height of 114 mm.

All the capacitors thus manufactured were introduced into a heated enclosure at a uniform temperature of 85° C. and subjected to the following DC voltage cycle:

170 hours at 250 volts
200 hours at 315 volts
210 hours at 365 volts
260 hours at 420 volts
240 hours at 460 volts
1000 hours at 500 volts, i.e. a total period of 2080 hours at 85° C.

The results obtained are given below in Tables I to IX.

TABLE I

Structure of the model I separator:
a film of porous polypropylene of 25 microns on the anode
a film of porous polypropylene of 25 microns on the cathode
an intermediate film of porous polypropylene of 25 microns
i.e. a total of three films of 25 microns forming a separator with a total thickness of 75 microns.

| Capacitor No. | Initial characteristics | | | | | Characteristics after 2080 hrs at 85° C. | | | | |
|---|---|---|---|---|---|---|---|---|---|---|
| | C ($\mu$F) | tg $\delta$ %[1] | If[2] | Z10kHz[3] | Z100kHz[4] | C ($\mu$F) | tg $\delta$ % | If | Z10kHz | Z100kHz |
| 1 | 715 | 1.4 | 100 | 29 | 17 | 650 | 3.5 | 340 | 38 | 21 |
| 2 | 720 | 1.3 | 110 | 28 | 16 | 660 | 3.6 | 360 | 38 | 21 |
| 3 | 710 | 1.5 | 52 | 29 | 17 | 650 | 3.8 | 400 | 39 | 22 |
| 4 | 720 | 1.4 | 42 | 29 | 17 | 650 | 3.9 | 400 | 38 | 21 |
| 5 | 710 | 1.4 | 32 | 29 | 17 | unserviceable at 1512 hrs | | | | |
| 6 | 710 | 1.4 | 40 | 29 | 17 | 650 | 3.8 | 340 | 38 | 21 |
| 7 | 730 | 1.4 | 24 | 28 | 16 | 660 | 3.8 | 340 | 38 | 22 |
| average values | 716 | 1.4 | 57 | 28.7 | 16.7 | 653.3 | 3.7 | 358 | 38 | 21.4 |

[1]C and tg $\delta$ (dielectric loss) measured at 100 Hz
[2]If = leak current after five minutes at a voltage of 480 Vcc, in $\mu$A
[3] and [4]impedances in m$\Omega$

TABLE II

Structure of the model II separator:
a paper sheet with a density of 0.30 and thickness of 75 microns on the anode
a paper sheet with a density of 0.30 and thickness of 50 microns on the cathode
i.e. a total of two paper sheets forming a separator of a thickness of 125 microns

| Capacitor No. | Initial characteristics | | | | | Characteristics after 2080 hrs at 85° C. | | | | |
|---|---|---|---|---|---|---|---|---|---|---|
| | C ($\mu$F) | tg $\delta$ % | If | Z10kHz | Z100kHz | C ($\mu$F) | tg $\delta$ % | If | Z10kHz | Z100kHz |
| 1 | 700 | 1.2 | 22 | 30 | 18 | unserviceable at 640 hrs | | | | |
| 2 | 700 | 1.2 | 24 | 30 | 18 | unserviceable at 640 hrs | | | | |
| 3 | 710 | 1.4 | 13 | 30 | 18 | unserviceable at 880 hrs | | | | |
| 4 | 700 | 1.3 | 10 | 30 | 18 | unserviceable at 620 hrs | | | | |
| 5 | 710 | 1.3 | 8 | 30 | 18 | unserviceable at 881 hrs | | | | |
| 6 | 710 | 1.1 | 8 | 30 | 18 | unserviceable at 756 hrs | | | | |
| 7 | 705 | 1.1 | 8 | 30 | 18 | unserviceable at 881 hrs | | | | |
| average values | 705 | 1.3 | 13 | 30 | 18 | | | | | |

TABLE III

Structure of the model III separator:
a porous polypropylene film of 25 microns on the anode
a paper sheet having a density of 0.30 and a thickness of 50 microns on the cathode
an intermediate paper sheet having a density of 0.30 and a thickness of 50 microns
i.e. a total of three layers forming a separator with a total thickness of 125 microns

| Capacitor | Initial characteristics | | | | | Characteristics after 2080 hrs at 85° C. | | | | |
|---|---|---|---|---|---|---|---|---|---|---|
| No. | C (μF) | tg δ % | If | Z10kHz | Z100kHz | C (μF) | tg δ % | If | Z10kHz | Z100kHz |
| 1 | 710 | 1.3 | 23 | 30 | 18 | 660 | 2.2 | 350 | 42 | 25 |
| 2 | 700 | 1.3 | 20 | 30 | 18 | 650 | 2.1 | 460 | 44 | 26 |
| 3 | 710 | 1.4 | 10 | 30 | 18 | 660 | 2.1 | 380 | 40 | 24 |
| 4 | 710 | 1.4 | 6 | 31 | 18 | 660 | 2.5 | 370 | 43 | 26 |
| 5 | 710 | 1.4 | 13 | 30 | 18 | 650 | 2.2 | 450 | 42 | 25 |
| 6 | 705 | 1.5 | 5 | 30 | 18 | 650 | 2.2 | 300 | 43 | 26 |
| 7 | 710 | 1.3 | 7 | 32 | 17 | 650 | 2.2 | 400 | 42 | 25 |
| average values | 708 | 1.4 | 12 | 30 | 18 | 654 | 2.2 | 387 | 42.3 | 25 |

TABLE IV

Structure of the model IV separator:
a paper sheet having a density of 0.30 and a thickness of 50 microns on the anode
a porous polypropylene film with a thickness of 25 microns on the cathode
an intermediate paper sheet with a density of 0.30 and a thickness of 50 microns
i.e. a total of three layers forming a separator with a total thickness of 125 microns

| Capacitor | Initial characteristics | | | | | Characteristics after 2080 hrs at 85° C. | | | | |
|---|---|---|---|---|---|---|---|---|---|---|
| No. | C (μF) | tg δ % | If | Z10kHz | Z100kHz | C (μF) | tg δ % | If | Z10kHz | Z100kHz |
| 1 | 725 | 1.4 | 24 | 30 | 19 | 670 | 1.6 | 330 | 42 | 28 |
| 2 | 730 | 1.8 | 11 | 30 | 19 | unserviceable at 1153 hrs | | | | |
| 3 | 725 | 1.8 | 12 | 30 | 19 | 670 | 2.8 | 350 | 55 | 36 |
| 4 | 725 | 1.8 | 10 | 30 | 19 | 670 | 3 | 270 | 58 | 39 |
| 5 | 720 | 1.5 | 10 | 30 | 19 | 670 | 3.1 | 250 | 55 | 36 |
| 6 | 720 | 1.4 | 8 | 30 | 19 | unserviceable at 1129 hrs | | | | |
| 7 | 720 | 1.4 | 11 | 30 | 19 | unserviceable at 1116 hrs | | | | |
| average values | 723 | 1.6 | 12 | 30 | 19 | 670 | 2.6 | 300 | 52.5 | 35 |

TABLE V

Structure of the model V separator:
a paper sheet with a density of 0.30 and a thickness of 50 microns on the anode
a paper sheet with a density of 0.30 and a thickness of 50 microns on the cathode
an intermediate porous polypropylene film of a thickness of 25 microns
i.e. a total of three layers forming a separator having a total thickness of 125 microns

| Capacitor | Initial characteristics | | | | | Characteristics after 2080 hrs at 85° C. | | | | |
|---|---|---|---|---|---|---|---|---|---|---|
| No. | C (μF) | tg δ % | If | Z10kHz | Z100kHz | C (μF) | tg δ % | If | Z10kHz | Z100kHz |
| 1 | 710 | 1.3 | 22 | 30 | 18 | unserviceable at 1504 hrs | | | | |
| 2 | 730 | 1.3 | 31 | 30 | 18 | unserviceable at 1413 hrs | | | | |
| 3 | 730 | 1.4 | 12 | 30 | 18 | 670 | 2.7 | 400 | 43 | 26 |
| 4 | 730 | 1.4 | 12 | 30 | 18 | 680 | 2.9 | 500 | 56 | 37 |
| 5 | 700 | 1.8 | 14 | 30 | 18 | 660 | 3 | 300 | 59 | 36 |
| 6 | 710 | 1.4 | 10 | 30 | 18 | 660 | 3 | 330 | 58 | 37 |
| 7 | 730 | 1.8 | 14 | 30 | 19 | 680 | 3.1 | 280 | 60 | 40 |
| average values | 720 | 1.5 | 16 | 30 | 18 | 666 | 3 | 362 | 55 | 35 |

TABLE VI

Structure of the model VI separator:
a paper sheet of density 0.30 and thickness 75 microns on the anode
a paper sheet of density 0.30 and thickness 50 microns on the cathode
an intermediate paper sheet of density 0.30 and thickness 50 microns
i.e. a total of three sheets forming a separator having a total thickness of 175 microns

| Capacitor | Initial characteristics | | | | | Characteristics after 2080 hrs at 85° C. | | | | |
|---|---|---|---|---|---|---|---|---|---|---|
| No. | C (μF) | tg δ % | If | Z10kHz | Z100kHz | C (μF) | tg δ % | If | Z10kHz | Z100kHz |
| 1 | 700 | 1.4 | 23 | 34 | 23 | unserviceable at 897 hrs | | | | |
| 2 | 710 | 1.5 | 13 | 34 | 24 | unserviceable at 675 hrs | | | | |
| 3 | 700 | 1.5 | 11 | 34 | 24 | unserviceable at 895 hrs | | | | |
| 4 | 705 | 1.4 | 14 | 34 | 24 | unserviceable at 675 hrs | | | | |
| 5 | 710 | 1.6 | 10 | 34 | 24 | unserviceable at 897 hrs | | | | |
| 6 | 720 | 1.4 | 11 | 33 | 24 | unserviceable at 675 hrs | | | | |
| 7 | 715 | 1.5 | 12 | 34 | 24 | unserviceable at 700 hrs | | | | |
| average values | 709 | 1.5 | 13 | 34 | 24 | | | | | |

TABLE VII

Structure of the model VII separator:
a porous polypropylene film of a thickness of 25 microns on the anode
a paper sheet of density 0.30 and thickness 75 microns on the cathode
an intermediate paper sheet of density 0.30 and thickness 75 microns
i.e. a total of three layers forming a separator with a total thickness of 175 microns

| Capacitor No. | Initial characteristics | | | | | Characteristics after 2080 hrs at 85° C. | | | | |
|---|---|---|---|---|---|---|---|---|---|---|
| | C (μF) | tg δ % | If | Z10kHz | Z100kHz | C (μF) | tg δ % | If | Z10kHz | Z100kHz |
| 1 | 700 | 1.4 | 15 | 34 | 24 | 650 | 2.5 | 370 | 45 | 30 |
| 2 | 705 | 1.5 | 10 | 35 | 26 | 650 | 2.2 | 260 | 45 | 30 |
| 3 | 705 | 1.5 | 10 | 36 | 26 | 650 | 2.2 | 270 | 45 | 31 |
| 4 | 690 | 1.5 | 10 | 36 | 26 | 640 | 2.3 | 250 | 45 | 32 |
| 5 | 690 | 1.5 | 7 | 36 | 26 | 630 | 2.3 | 310 | 45 | 31 |
| 6 | 700 | 1.4 | 10 | 36 | 26 | 640 | 2.3 | 300 | 46 | 32 |
| 7 | 690 | 1.6 | 10 | 36 | 26 | 640 | 2.4 | 290 | 47 | 32 |
| average values | 697 | 1.5 | 10 | 35.5 | 25.7 | 643 | 2.3 | 293 | 45.7 | 31 |

TABLE VIII

Structure of the model VIII separator:
a paper sheet of density 0.30 and thickness 75 microns on the anode
a paper sheet of density 0.30 and thickness 75 microns on the cathode
an intermediate porous polypropylene film of thickness 25 microns
i.e. a total of three layers forming a separator with a total thickness of 175 microns

| Capacitor No. | Initial characteristics | | | | | Characteristics after 2080 hrs at 85° C. | | | | |
|---|---|---|---|---|---|---|---|---|---|---|
| | C (μF) | tg δ % | If | Z10kHz | Z100kHz | C (μF) | tg δ % | If | Z10kHz | Z100kHz |
| 1 | 705 | 1.4 | 25 | 34 | 24 | unserviceable at 1128 hrs | | | | |
| 2 | 720 | 1.5 | 15 | 34 | 24 | unserviceable at 1131 hrs | | | | |
| 3 | 730 | 1.5 | 10 | 36 | 26 | unserviceable at 1125 hrs | | | | |
| 4 | 720 | 1.5 | 12 | 36 | 26 | unserviceable at 1130 hrs | | | | |
| 5 | 730 | 1.6 | 12 | 36 | 26 | 680 | 3.7 | 350 | 70 | 50 |
| 6 | 730 | 1.8 | 12 | 34 | 24 | 680 | 3.6 | 500 | 69 | 51 |
| 7 | 725 | 1.8 | 12 | 34 | 24 | 690 | 3.6 | 413 | 68 | 50 |
| average values | 723 | 1.6 | 14 | 35.4 | 25 | 683 | 3.6 | 413 | 68 | 50,3 |

The average values obtained in each of the tables of results are shown in Table IX hereafter to facilitate comparison

TABLE IX

| Separator of Table No. | Thickness of the separator in microns | Series resistance of the separator Ω·cm² | Initial characteristics | | | | | Characteristics after 2080 hrs at 85° C. | | | | | Number of defects out of 7 pieces |
|---|---|---|---|---|---|---|---|---|---|---|---|---|---|
| | | | C (μF) | tg δ % | If | Z10kHz | Z100kHz | C (μF) | tg δ % | If | Z10kHz | Z100kHz | |
| I | 75 | 67 | 716 | 1.4 | 57 | 28.7 | 16.7 | 653 | 3.7 | 358 | 38 | 21.4 | 1 |
| II | 125 | 74 | 705 | 1.3 | 13 | 30 | 18 | unserviceable | | | | | 7 |
| III | 125 | 74 | 708 | 1.4 | 12 | 30 | 18 | 654 | 2.2 | 387 | 42.3 | 25 | 0 |
| IV | 125 | 80 | 723 | 1.6 | 12 | 30 | 19 | 670 | 2.6 | 300 | 52.5 | 35 | 3 |
| V | 125 | 75 | 720 | 1.5 | 16 | 30 | 18 | 668 | 3 | 362 | 55 | 35 | 2 |
| VI | 175 | 109 | 709 | 1.5 | 13 | 34 | 24 | unserviceable | | | | | 1 |
| VII | 175 | 115 | 679 | 1.5 | 10 | 35 | 25,7 | 643 | 2.3 | 293 | 45.7 | 31 | 0 |
| VIII | 175 | 115 | 723 | 1.6 | 14 | 35 | 25 | 683 | 3.6 | 413 | 68 | 50,3 | 4 |

DISCUSSION

The electrolyte used for comparing the capacitors including the separators of models I to VIII was formulated in accordance with the disclosure of U.S. Pat. No. 3,638,077, example 1, so as to obtain a resistivity of 1365Ω·cm at 20° C. The solvent mixture used contained 11 moles of butyrolactone and 0.80 mole of ethylene glycol.

U.S. Pat. No. 3,908,157 shows in Table VIII that only a very low electric porosity was obtained with porous polypropylene impregnated with an electrolyte using as solvent either butyrolactone or glycol.

It has been surprisingly discovered that the porous polypropylene was well impregnated with the high-voltage electrolyte of U.S. Pat. No. 3,638,077 mentioned above and the solvent phase of which is a mixture of these two solvents, after 24 hours of drying the coils at 100° C., placing them in a vacuum at 90° C. for two hours, impregnation with the electrolyte injected in a vacuum at 90° C. and maintenance at this temperature with immersion for 15 hours after return to atmospheric pressure.

In return, the capacitors of Table I which contain a separator with three porous polypropylene films have very good initial characteristics with an average of dielectric losses of 1.4% and a mean impedance value measured at 100 kHz of 16.7, mΩ from which it can be deduced that the electric porosity obtained is % P=25. This value is greater than almost all those shown in Table VIII of U.S. Pat. No. 3,908,157.

The comparison of the results of the life-span test contained in the tables above allow to draw the following conclusions:

the capacitors with a paper separator of a thickness of 125 microns of Table II and a thickness of 175 microns of Table VI were all destroyed, whereas those which contained a porous polypropylene film in the separator for the same total thickness resisted partially (Tables IV, V, VIII) or totally (Tables III and VII);

Tables III and VII show surprisingly and unpredictably that the capacitors having a porous polypropylene film located against the anode resisted the test without presenting any defect in both those with a total thickness of 125 microns and those of 175 microns;

the capacitors which have a paper sheet placed against the anode (Tables IV, V and VIII) present much higher drifts in dielectric losses (tg δ%) and in impedance measured at 10 and 100 kHz than those in which a porous polypropylene film was placed against the anode (Tables III and VII).

Table I shows that the separator formed with three made from etched aluminum, separated by the separators described in Tables X and XI which follow.

The coils thus obtained were impregnated with the same electrolyte as the capacitors of Tables I to VIII and mounted in similar cases having a diameter of 51 mm and a height of 114 mm.

This second series of capacitors were introduced into an enclosure heated to a uniform temperature of 85° C. and subjected to the following DC voltage cycle:
1000 hours at 500 volts
960 hours at 525 volts
i.e. a total duration of 1960 hours at 85° C.

The results obtained are shown in Tables X and XI hereafter:

TABLE X

Structure of separator:
a paper sheet of density 0.55 and a thickness of 50 microns on the anode
a porous polypropylene film of a thickness of 25 microns on the cathode
an intermediate paper sheet of density 0.55 and a thickness of 50 microns
i.e. a total of three layers forming a separator with a total thickness of 125 microns

| Capacitor | Initial characteristics | | | | | Characteristics after 1960 hrs at 85° C. | | | | |
|---|---|---|---|---|---|---|---|---|---|---|
| No. | C (μF) | tg δ % | If | Z10kHz | Z100kHz | C (μF) | tg δ % | If | Z10kHz | Z100kHz |
| 1 | 600 | 4.6 | 600 | 112 | 72 | 520 | 6.5 | 160 | 155 | 86 |
| 2 | 605 | 4.5 | 580 | 108 | 68 | 520 | 6.7 | 170 | 150 | 100 |
| 3 | 600 | 4.6 | 650 | 108 | 67 | 520 | 6.7 | 150 | 150 | 99 |
| 4 | 615 | 4.7 | 500 | 105 | 68 | unserviceable at 1432 hrs | | | | |
| average values | 605 | 4.6 | 582,5 | 108 | 69 | 520 | 6.6 | 160 | 152 | 95 |

TABLE XI

Structure of separator:
a porous polypropylene film of a thickness of 25 microns on the anode
a paper sheet of a density of 0.55 and a thickness of 50 microns on the cathode
an intermediate paper sheet of density 0.55 and thickness 50 microns
i.e. a total of three layers forming a separator having a total thickness of 125 microns

| Capacitor | Initial characteristics | | | | | Characteristics after 1960 hrs at 85° C. | | | | |
|---|---|---|---|---|---|---|---|---|---|---|
| No. | C (μF) | tg δ % | If | Z10kHz | Z100kHz | C (μF) | tg δ % | If | Z10kHz | Z100kHz |
| 1 | 610 | 5.1 | 600 | 110 | 70 | 520 | 6.8 | 200 | 155 | 96 |
| 2 | 605 | 4.8 | 700 | 110 | 68 | 490 | 4.8 | 370 | 145 | 88 |
| 3 | 610 | 4.8 | 1900 | 110 | 72 | 500 | 4.8 | 340 | 150 | 92 |
| 4 | 615 | 4.8 | 1900 | 110 | 72 | 500 | 4.8 | 220 | 135 | 88 |
| average values | 610 | 4.9 | 1275 | 110 | 70 | 502 | 5.2 | 282,5 | 146 | 89 |

The average value of the series resistance of the separator of the capacitors of TABLE X is 420Ω·cm² and that of the capacitors of Table XI 426Ω·cm².

porous polypropylene films presents a defect and that at least a fourth film should be added to resist the test, but this presents no interest. In fact, the series resistance of this three-film separator is 67.4Ω·cm² and with four films it would go up to 92Ω·cm², whereas the model III separator (Table III) operated well without defect, although its series resistance is 74.8Ω·cm², and moreover it gave a lower increase of the dielectric losses.

Table IX sums up these comparisons of the average values of the characteristics shown in Tables I to VIII and gives in column 3 the value of the series resistance for each separator in Ω·cm². An examination of these values with respect to the number of defects indicated in column 14 shows that said number does not depend on said series resistance. However, it is interesting to know whether the influence of the position of the porous polypropylene film is transposable to separators with a much higher series resistance.

With this end in view, a second series of capacitors was manufactured with an anode of 380×9 cm made from aluminum of a 99.99% purity and a thickness of 90 microns, etched and formed anodically at 600 volts, identical to the one used in the preceding capacitors, and with a cathode having a thickness of 30 microns A comparison of Tables X and XI shows that:
the capacitors having a porous polypropylene film placed against the anode (Table XI) resisted the test without presenting any defect;
the capacitors which had a paper sheet placed against the anode (Table X) were partially destroyed and presented higher drifts in dielectric losses (tg δ%) and in impedance measured at 10 and 100 kHz.

The influence of the position of the porous polymer film in the composite separator is then transposable to the separators having a higher series resistance.

The scintillations which are produced at certain points of the anode layer are the center of gas release. The paper in contact with the anode foil allows these gases to advance into the thickness of the separator while expulsing therefrom the electrolyte and causing breakdown thereof.

In fact, paper of density 0.30 has a cellular porosity of 80% with pores whose section varies from about $0.008 \times 10^{-4}$ to $3.2 \times 10^{-4}$ cm². These pores establish a low capillary pressure of about 10 to 175 g/cm² for a liquid such as glycol, for example. For a porous polymer film, such for example as the porous polypropylene film used above, in contact with the anode foil, the gases coming from the regeneration of the anode layer can no longer develop in the thickness of the separator, but are laminated and forced to diffuse to the gaps between the surface of the etched anode and the polymer film. In fact, in the porous polypropylene the cellular porosity which is from 35 to 50% is made with pores whose section varies from about $0.0045 \times 10^{-8}$ cm$^2$ to $0.160 \times 10^{-8}$ cm$^2$ and the capillary pressure of a liquid, such as glycol, contained in these pores is of the order of 4 to 20 kg/cm$^2$, so that the impregnated porous polymer film forms a gas-tight barrier considering that the diffusion pressure of the gases between the layers is of the order of 1 kg/cm$^2$.

For the composite separator to have an improved voltage behavior, the film of porous polymer must have a cellular porosity greater than 30% and pores whose section is less than $0.2 \times 10^{-8}$ cm$^2$.

The composite separator of the invention provides a considerable improvement in the quality factor defined by the expression $V^2/Zv$. A comparison was made between 480 volts capacitors presently available on the market coming from three different manufacturers labeled 1, 2 and 3 and a capacitor manufactured with the separator of model III described above. So that the measurements would be as exact as possible, they were carried out on the coils withdrawn from the cases of these capacitors.

Table XII hereafter gives the results of this comparison.

The capacitor manufactured with the model III separator of the invention brings an improvement in the quality factor of the order of six times.

The invention is not limited to the electrolyte formulation mentioned above. Similar results may be obtained with an electrolyte formed from 11 moles of glycol, 1.5 mole of butyrolactone, 7 moles of boric acid and 1.4 mole of ammonia, but with higher impedance values.

Figure 3:
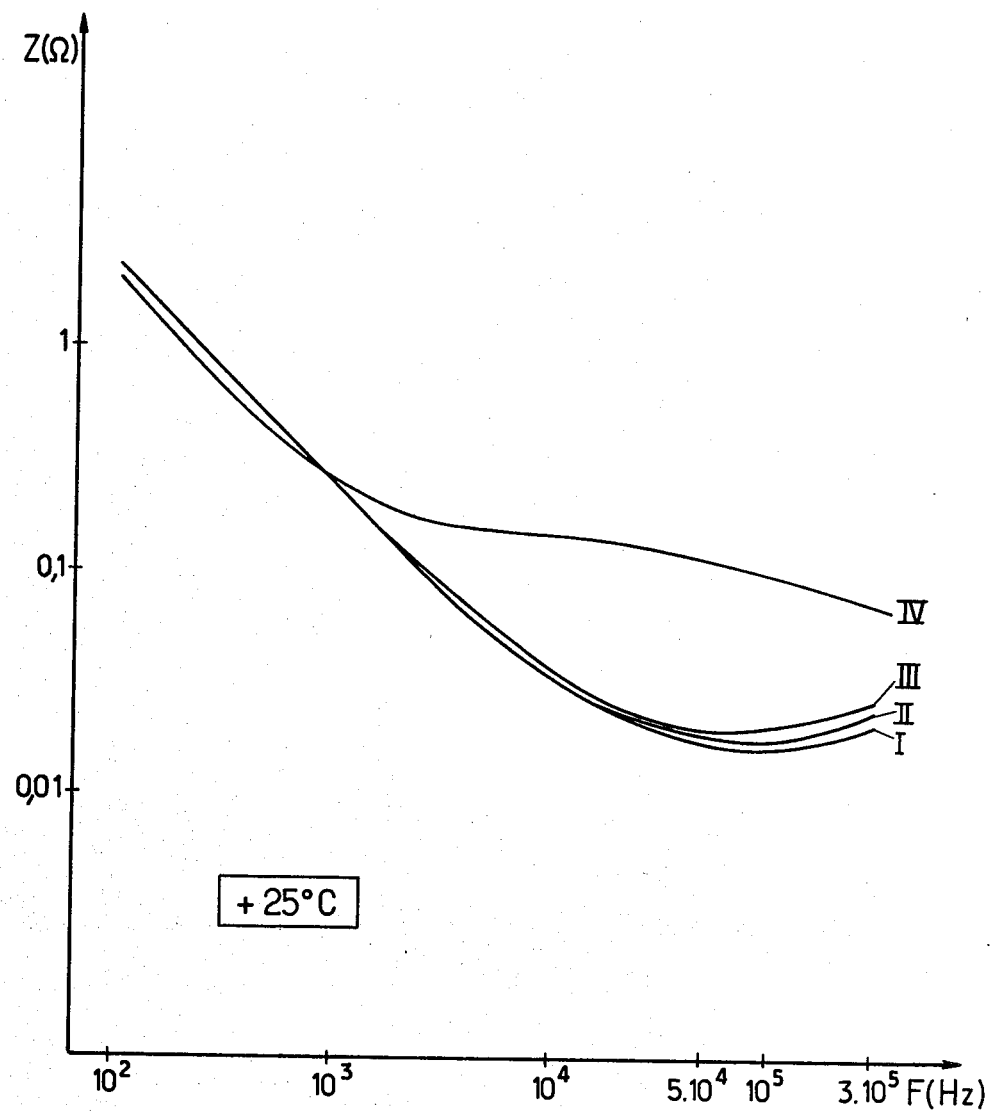
Figure 4:
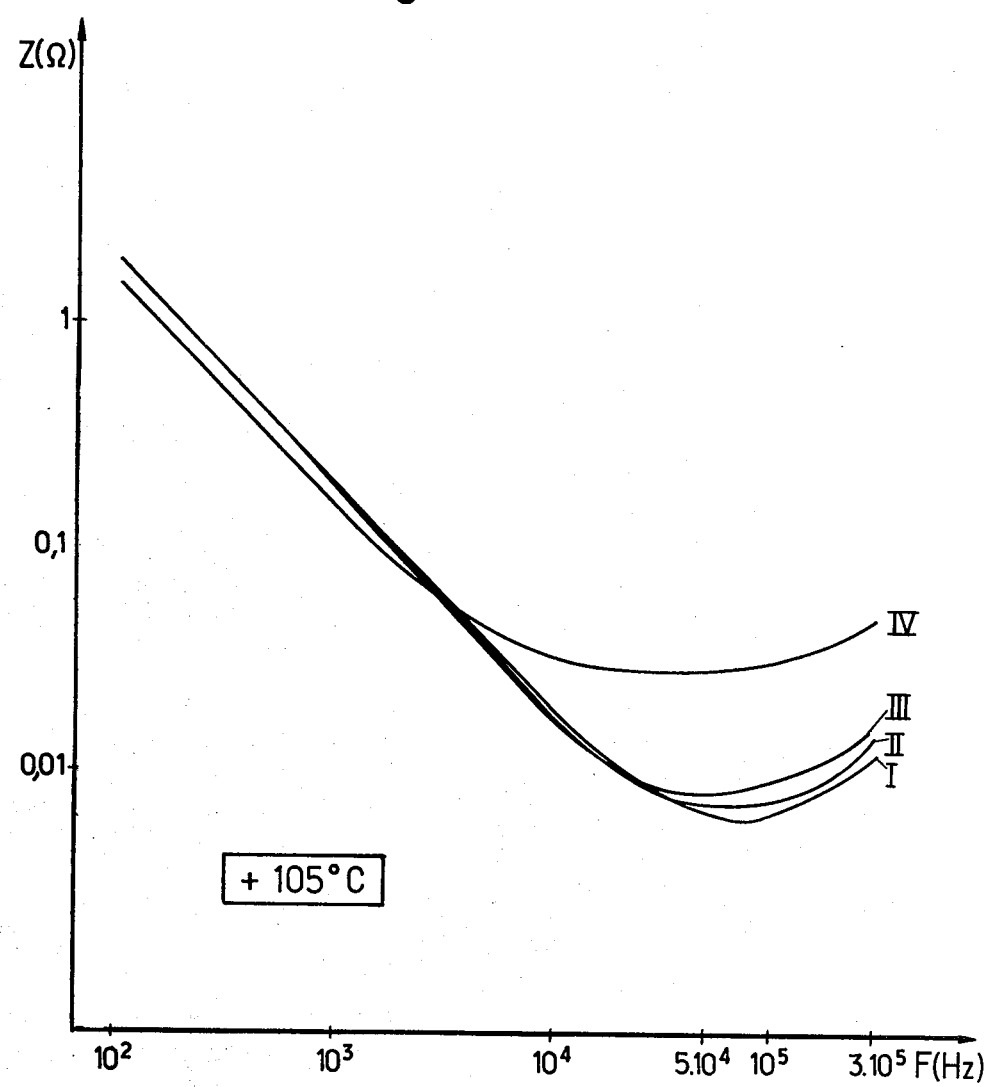
FIG. 4 shows the curves of impedance Z plotted against the frequency, at the temperature of 105° C. for the same elements as those in FIG. 3.
Figure 5:
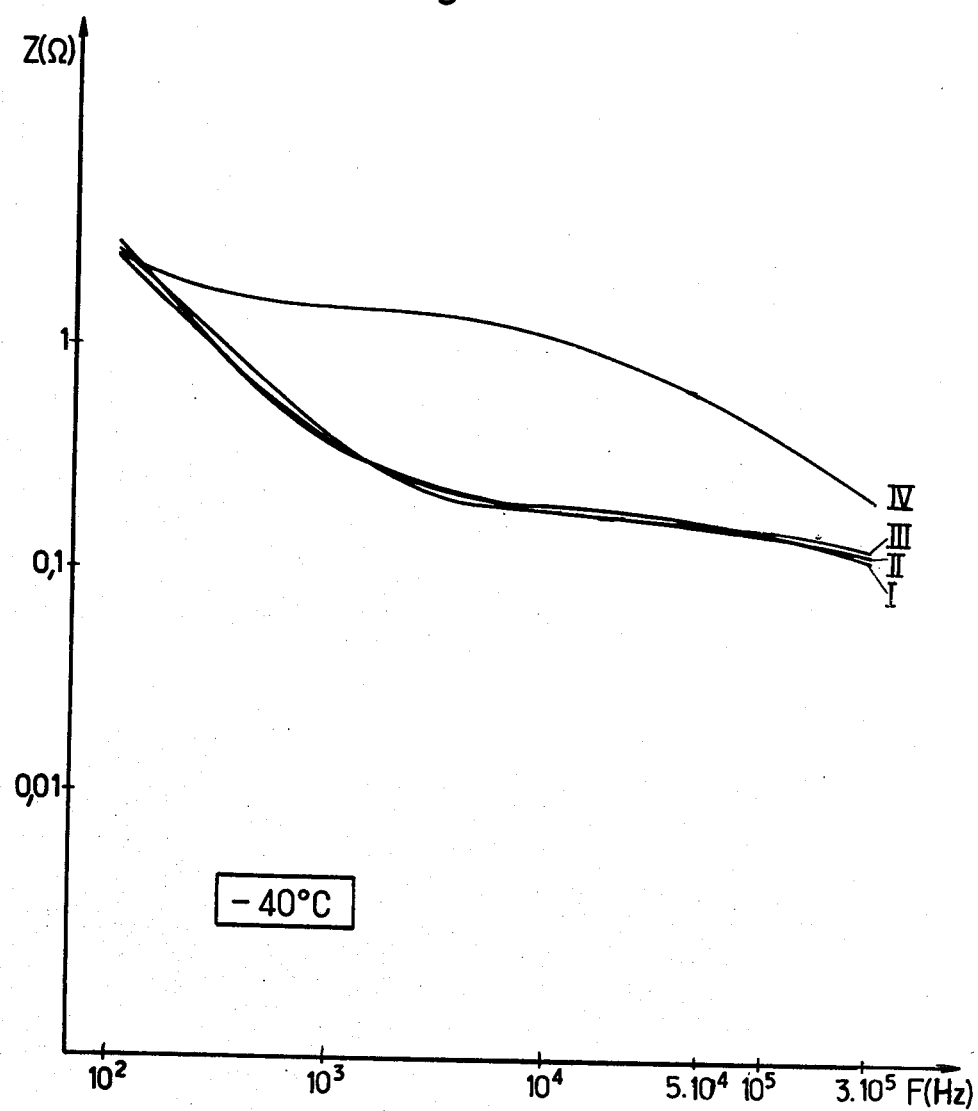
FIG. 5 shows the curves of impedance Z plotted against the frequency, at the temperature of −40° C. for the same elements as those in FIG. 3.

FIG. 3, which gives at the temperature of 25° C. the comparison of the impedance curves in the frequency band extending from $10^2$ to $3.10^5$ Hz taken from capacitors fitted respectively with the model I separator having three porous polypropylene films of a total thickness of 75 microns (Curve I), model II separator with two absorbent paper sheets of a total thickness of 125 microns (Curve II) and model III composite separator with a porous polypropylene film and two paper sheets of a total thickness of 125 microns (Curve III), shows that the differences between the three models are small and yet only model III resisted the lifespan tests at 85° C. at 500 volts and not the others. Curve IV, taken from a commercially available capacitor of 560 µF, 480 V, illustrates the gain obtained with the composite separator of the invention. FIG. 4, which shows the same comparison at the temperature of 105° C. between the same elements, and FIG. 5, corresponding to the temperature of −40° C., call forth the same observations as FIG. 3.

It was not at all certain that other porous polymer film than porous polypropylene films could be used in

TABLE XII

Quality factor $\frac{V^2}{Zv}$

| Manufacturer | Diameter of spindle cm | Diameter of coil cm | Height of coil cm | Volume of coil cm$^3$ | C (µF) | v | Z | V | $\frac{V^2}{Zv}$ |
|---|---|---|---|---|---|---|---|---|---|
| No. 1 | 0.5 | 3.8 | 11.9 | 132.6 | 400 | 0.331 | 0.081 | 480 | $8.6 \times 10^6$ |
| No. 2 | 0.5 | 3 | 11.9 | 82 | 290 | 0.282 | 0.097 | 480 | $8.4 \times 10^6$ |
| No. 3 | 1 | 4.9 | 10 | 180 | 772 | 0.234 | 0.095 | 480 | $10.4 \times 10^6$ |
| separator model III | 1 | 4.4 | 10.2 | 147 | 708 | 0.207 | 0.018 | 480 | $61.8 \times 10^6$ |

V = operating voltage of the capacitor in volts
Z = impedance of the capacitor at 100 kHz in ohms
v = specific volume in cm$^3$/µF
In this Table, the model III separator is compared with the other 480 volts coils for the sake of convenience, but it may operate at 500 volts, as the results described above have shown.

It is well known that the resistivity of electrolyte and the apparent density of the separating paper must be adjusted by increasing values as the service voltage of the capacitors increases, so that the series resistance of the impregnated separator increases with respect to this service voltage.

It is then remarkable to discover that a composite separator of the invention comprising, in combination, at least one porous polypropylene film and at least one absorbent paper sheet with low apparent density provides simultaneously a considerable lowering of the series resistance and a better voltage behavior.

For the different applications of electrolytic capacitors, particularly for those mentioned in the preamble, capacitors may be constructed having an impedance from 18 to 25 mΩ (instead of 80 to 100 mΩ for capacitors of the present state of the art) usable with AC currents two and three times higher than those used with the capacitors of the present state of the art, owing to the separators of the invention.

association with paper sheets for forming separators for electrolytic capacitors adapted to operate under high voltages.

In fact above 250 volts and especially above 500 volts sparks appear between the anode and separator in conventional electrolytic capacitors under operation, said sparks originating from the regeneration of the anode. Such sparks have a tendency to destroy the separator.

Such destructions did not appear in electrolytic capacitors according to the invention with separators having at least one porous polypropylene film and one impregnated paper sheet, said polypropylene film being located against the anode of the capacitor. The Applicants initially believed that this absence of destructions by sparks was due to the fact that polypropylene was a hydrocarbon polymer which did not decompose in compounds which chemically attacked the anode.

Therefore they thought initially that polyesters for example which contained an acidic portion could, when decomposed, attack the anode.

However when temperature tests were made with a polypropylene film, on the one hand, and a polyester film, as polybutylene terephtalate film, on the other hand, associated to an impregnated paper sheet for constituting a separator for an electrolytic capacitor, the film being located against the anode, it appeared that no degradation of the anode took place when the capacitor operated at high voltages, as 500 volts.

For these comparative tests two capacitors were built, each including

- an anode, of 320×9 cm, in aluminium of 99.99% purity, of 90 microns thickness, engraved and formed anodically under 600 volts;
- a cathode in engraved aluminium having a thickness of 30 microns; and
- a separator as specified in Tables XIII and XIV respectively.

The capacitors of Table XIII include a porous polypropylene film against their anode, whereas the capacitors of Table XIV include a porous polybutylene teraphtalate film against their anode.

The coils obtained in each case were impregnated by an electrolyte according to example 1 of U.S. Pat. No. 3,638,077 mentioned hereinabove, in order to obtain a resistivity of 1365Ω·cm at 20° C., as in the examples discussed in relations to Tables I to XII.

The two series of capacitors of Tables XIII and XIV, after determining the initial characteristics, were introduced in an enclosure heated at the uniform temperature of 85° C. and maintained during 2112 hours under a voltage of 500 volts, then withrawn from said enclosure and the characteristics were against determined after the temperature was brought back to 20° C.

The obtained results are indicated in Tables XIII and XIV.

TABLE XIII

Structure of the separator:
a porous polypropylene film of 60 microns thickness on the anode
a paper sheet having a density of 0.36 and a thickness of 75 microns on the cathode
i.e. a total of two layers forming a separator with a total thickness of 125 microns

| | Initial characteristics | | | | | Characteristics after 2112 hrs at 85° C. under 500 Vcc | | | | |
|---|---|---|---|---|---|---|---|---|---|---|
| Capacitor No. | C (μF) | tg ∂ % | If (μA) | Z 10 KHz | Z 100 KHz | C (μF) | tg ∂ % | If (μA) | Z 10 KHz (mΩ) | Z 100 KHz |
| 1 | 711 | 2.7 | 290 | 36 | 24.5 | 641 | 3.8 | 240 | 64 | 50 |
| 2 | 719 | 2.6 | 270 | 35 | 24 | 651 | 3.5 | 440 | 62 | 50 |
| 3 | 709 | 2.9 | 240 | 37 | 25 | 642 | 3.7 | 330 | 65 | 52 |
| average values | 713 | 2.7 | 267 | 36 | 24.5 | 645 | 3.7 | 337 | 64 | 50.6 |

TABLE XIV

Structure of the separator:
a porous polyester film of 75 microns thickness on the anode
a paper sheet having a density of 0.36 and a thickness of 50 microns on the cathode
i.e. a total of two layers forming a separator with a total thickness of 125 microns

| | Initial characteristics | | | | | Characteristics after 2112 hrs at 85° C. under 500 Vcc | | | | |
|---|---|---|---|---|---|---|---|---|---|---|
| Capacitor No. | C (μF) | tg ∂ % | If (μA) | Z 10 KHz | Z 100 KHz | C (μF) | tg ∂ % | If (μA) | Z 10 KHz (mΩ) | Z 100 KHz |
| 1 | 735 | 3.2 | 180 | 39 | 28 | 655 | 3.9 | 180 | 69 | 57 |
| 2 | 738 | 3.3 | 180 | 41 | 30 | 657 | 4.0 | 250 | 71 | 60 |
| 3 | 720 | 3.1 | 170 | 38 | 27 | 644 | 3.7 | 180 | 66 | 54 |
| average values | 731 | 3.2 | 177 | 39 | 28 | 652 | 3.9 | 203 | 69 | 57 |

The initial characteristics of the two types of capacitors are very similar and after the test of 2112 hrs at 85° C. under 500 Vcc, the comparison of the variations is summarized in the following Table XV.

TABLE XV

| | $\frac{\Delta C}{C}$ % | $\frac{\Delta tg\,\partial}{tg\,\partial}$ % | $\frac{\Delta If}{If}$ % | $\frac{\Delta Z}{Z}$ 10 KHz % | $\frac{\Delta Z}{Z}$ 100 KHz % |
|---|---|---|---|---|---|
| Series I - polypropylene | −9.5 | +37 | +26.2 | +78 | +106 |
| Series II - polyester | −10.8 | +21.9 | +14.7 | +76.9 | +103 |

It should be noted that, in Tables XIII and XIV, C and tg δ have been measured at 100 Hz and that If represents the leak current after 5 minutes under a voltage of 480 Vcc in μA. Impedances Z at 10 kHz and 100 kHz are given in mΩ.

The variations of the characteristics for the two types of separators of Tables XIII and XIV are comparable, the composition of the porous polymer film on the anode being not critical.

The invention is not limited to porous polypropylene films or porous polybutylene teraphtalate films, given as examples of porous polymers, but includes all porous polymer films associated to impregnated paper sheets for forming separators.

It appears for the above disclosure that the invention has for object a composite separator for electrolytic capacitors having a reduced series resistance Z, while allowing the application of a high service voltage V, i.e. finally a high coefficient of quality $V^2/Zv$ (v being the specific volume of the capacitor).

We claim:
1. An electrolytic capacitor comprising:
(a) an anode;
(b) a cathode; and
(c) a separator located between said anode and said cathode, wherein the separator is formed by the association of at least one film of porous polymer and at least one sheet of absorbant paper impregnated with an electrolyte, and wherein said film of porous polymer is disposed against said anode.

2. A capacitor according to claim 1 wherein said film of porous polymer is impregnated with an electrolyte.

3. A capacitor according to claim 1 wherein said film of porous polymer is a film of porous polypropylene.

4. A capacitor according to claim 3 wherein said film of porous polypropylene has an open cellular porosity of at least 30 percent and possesses a network of capillaries of section less than $0.2 \times 10^{-8}$ cm$^2$.

5. A capacitor according to claim 1 wherein said film of porous polymer is a film of porous polyester.

6. A capacitor according to claim 5 wherein said film of porous polyester is a film of porous polybutylene terephtalate.

7. A capacitor according to claim 1 wherein said absorbant paper has a relative density not greater than 0.55.

8. A capacitor according to claim 1 wherein said electrolyte comprises, in its solvent phase, at least one solvent chosen from the group consisting of butyrolactone and ethylene glycol.

9. A capacitor according to claim 2 wherein said electrolyte comprises, in its solvent phase, at least one solvent chosen from the group consisting of butyrolactone and ethylene glycol.

* * * * *